(12) United States Patent
deLescure et al.

(10) Patent No.: US 10,592,358 B2
(45) Date of Patent: *Mar. 17, 2020

(54) FUNCTIONAL INTERCONNECT REDUNDANCY IN CACHE COHERENT SYSTEMS

(71) Applicant: Arteris, Inc., Campbell, CA (US)

(72) Inventors: Benoit deLescure, Berkeley, CA (US); Jean Philippe Loison, San Jose, CA (US); Alexis Boutiller, Campbell, CA (US); Rohit Bansal, San Jose, CA (US); Parimal Gaikwad, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,727

(22) Filed: Dec. 27, 2016

(65) Prior Publication Data

US 2018/0157545 A1 Jun. 7, 2018

Related U.S. Application Data

(63) Continuation of application No. 15/387,625, filed on Dec. 21, 2016.

(60) Provisional application No. 62/429,878, filed on Dec. 5, 2016.

(51) Int. Cl.
*G06F 11/07* (2006.01)
*G06F 12/0815* (2016.01)
*G06F 11/16* (2006.01)
*G06F 12/0837* (2016.01)

(52) U.S. Cl.
CPC ........ *G06F 11/1666* (2013.01); *G06F 11/079* (2013.01); *G06F 11/1641* (2013.01); *G06F 11/1695* (2013.01); *G06F 12/0815* (2013.01); *G06F 12/0837* (2013.01); *G06F 2212/1032* (2013.01); *G06F 2212/60* (2013.01)

(58) Field of Classification Search
CPC .............. G06F 11/079; G06F 12/0815; G06F 11/0751; G06F 11/0736
See application file for complete search history.

(56) References Cited

U.S. PATENT DOCUMENTS 5,787,468 A * 7/1998 Clark .................. G06F 12/0813
711/121
7,301,831 B2 * 11/2007 Ware .................. G06F 13/1689
365/191
8,743,636 B2 * 6/2014 Ware .................. G06F 13/1689
365/191

(Continued)

*Primary Examiner* — Phung M Chung
(74) *Attorney, Agent, or Firm* — Dana Legal Services; Jubin Dana; John Dahnad

(57) ABSTRACT

A distributed system implementation for cache coherence comprises distinct agent interface units, coherency controllers, and memory interface units. The agents send requests in the form of read and write transactions. The system also includes a memory that includes coherent memory regions. The memory is in communication with the agents. The system includes a coherent interconnect in communication with the memory and the agents. The system includes a second identical coherent interconnect in communication with the memory and the agents. The system also includes a comparator for comparing at least two inputs, the comparator is in communication with the two coherent interconnects.

12 Claims, 2 Drawing Sheets

(56) References Cited

U.S. PATENT DOCUMENTS

2013/0086296 A1\* 4/2013 Lakshmanamurthy ..................... G06F 13/364
                                                                    710/314
2016/0012010 A1\* 1/2016 Ganapathy .......... G06F 13/4036
                                                                    710/104

\* cited by examiner

FUNCTIONAL INTERCONNECT REDUNDANCY IN CACHE COHERENT SYSTEMS

CROSS-REFERENCE TO RELATED APPLICATION

This application is a continuation of U.S. application Ser. No. 15/387,625 filed on Dec. 21, 2016 entitled REDUNDANCY FOR CACHE COHERENCE SYSTEMS by Benoit deLESCURE et al. and claims the benefit of U.S. Provisional Application Ser. No. 62/429,878 titled REDUNDANCY FOR CACHE COHERENCE SYSTEMS filed on Dec. 5, 2016 by Benoit deLESCURE, the entire disclosures of both are incorporated in their entirety herein, by reference

FIELD OF THE INVENTION

The invention is in the field of computer systems and, more specifically, to system-on-chip designs for cache coherent systems.

BACKGROUND

Since computer processors with caches were first combined into multiprocessor systems there has been a need for cache coherence. More recently cache coherent multiprocessor systems have been implemented in systems-on-chips (SoCs). The cache coherent systems in SoCs comprise instances of processor intellectual properties (IPs), memory controller IPs, and cache coherent system IPs connecting the processors and memory controllers. More recently some SoCs integrate other agent IPs having coherent caches, such as graphics processing units, into heterogeneous multiprocessor systems. Such systems comprise a single centralized monolithic cache coherent system IP.

In the physical design of such SoCs, the centralized cache coherent system IP is a hub of connectivity. Wires connect transaction interfaces of each agent with the coherence system IP and from that to the memory controller IP. Such an arrangement causes an area of significant congestion for wire routing during the physical design phase of the chip design process. Some of these design and systems are often used in extreme environments or under conditions where the potential for errors are not acceptable or tolerated. For example, these systems may be used in automotive or aviation. As a result, it is necessary to have a system and method that monitors requests and resulting response to determine if an error may have occurred in the process and report the error to a system monitor.

SUMMARY OF THE INVENTION

The invention involves cache coherence system IP and monitors requests and resulting responses to determine if any error has occurred and report it; and, when possible, correct the error. In accordance with various aspects of the invention, some coherent interconnect units are stamped out in duplicate, such that there is a functional coherent interconnect unit and a checker coherent interconnect unit. The term "unit" as used herein may refer to one or more circuits, components, registers, processors, software subroutines, or any combination thereof. The separate units communicate with each other, and are logically coupled through a transport network.

Systems that embody the invention, in accordance with the aspects thereof, are typically designed by describing their functions in hardware description languages. Therefore, the invention is also embodied in such hardware descriptions, and methods of describing systems as such hardware descriptions, but the scope of the invention is not limited thereby. Furthermore, such descriptions can be generated by computer aided design (CAD) software that allows for the configuration of coherence systems and generation of the hardware descriptions in a hardware description language. Therefore, the invention is also embodied in such software.

DETAILED DESCRIPTION

Figure 1:
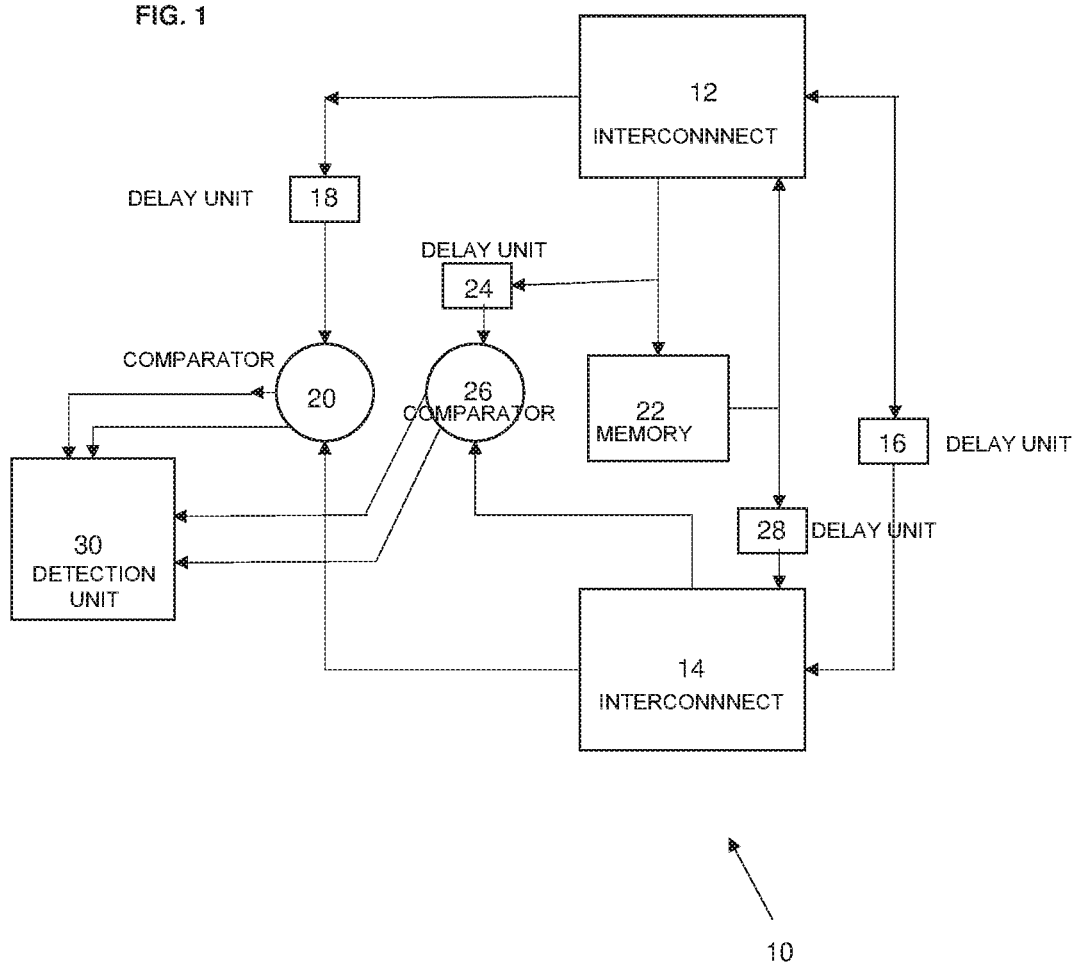
FIG. 1 illustrates an embodiment of a system in accordance with the present invention.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures, in which like numbers represent the same or similar elements.

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with various aspects and embodiment of the invention a distributed system implementation for cache coherence includes distinct agent interface units, coherency controllers, and memory interface units. The agents send requests in the form of read and write transactions. The system also includes a memory. The memory includes coherent memory regions. The memory is in communication with the agents. The system includes a coherent interconnect in communication with the memory and the agents. The system includes a second coherent interconnect in communication with the memory and the agents. The system also includes a comparator for comparing at least two inputs, the comparator is in communication with the two coherent interconnects. The features of the system are outlined and discussed below.

A cache coherence system performs at least three essential functions:
1. Interfacing to coherent agents—This function includes accepting transaction requests on behalf of a coherent agent and presenting zero, one, or more transaction responses to the coherent agent, as required. In addition, this function presents snoop requests, which operate on the coherent agent's caches to enforce coherence, and accepts snoop responses, which signal the result of the snoop requests.
2. Enforcing coherence—This function includes serializing transaction requests from coherent agents and sending snoop requests to a set of agents to perform coherence operations on copies of data in the agent caches. The set of agents may include any or all coherent agents and may be determined by a directory or snoop filter (or some other filtering function) to minimize the system bandwidth required to perform the coherence operations. This function also includes receiving snoop responses from coherent agents and providing the individual snoop responses or a summary of the snoop responses to a coherent agent as part of a transaction response.
3. Interfacing to the next level of the memory hierarchy—This function includes issuing read and write requests to a memory, such as a DRAM controller or a next-level cache, among other activities.

Performing these functions in a single unit has the benefit of keeping the logic for these related functions close together, but has several major drawbacks. The single unit will be large, and therefore will use a significant amount of silicon area. That will cause congestion in routing of wires around the unit. A single unit will also tend to favor having a single memory or, if multiple memories are used, having them close together to avoid having excessively long wires between the single coherence unit and the memories. Multiple memories, which are typically implemented with interleaved address ranges, are increasingly prevalent.

An aspect of the invention is separation of the functions of a cache coherence system into multiple distinct units, and coupling of them with a transport network. The units communicate by sending and receiving information to each other through the transport network. The units are, fundamentally:
1. Agent Interface Unit (AIU)—This unit performs the function of interfacing to one or more agents. Agents may be fully coherent, IO-coherent, or non-coherent. The interface between an agent interface unit and its associated agent uses a protocol. The Advanced Microcontroller Bus Architecture (AMBA) Advanced eXtensible Interface (AXI) Coherency Extensions (ACE) is one such protocol. In some cases, an agent may interface to more than one agent interface unit. In some such cases, each agent interface unit supports an interleaved or hashed subset of the address space for the agent.
2. Coherence controller unit—This unit performs the function of enforcing coherence among the coherent agents for a set of addresses.
3. Memory interface unit—This unit performs the function of interfacing to all or a portion of the next level of the memory hierarchy.
4. Local memory—The memory, for, example SRAM, might be used by a unit to store information locally. For instance, a snoop filter will rely on storage by the Coherence Controller unit of information regarding location and sharing status of cache lines. This information might be stored in a Local memory. The Local memory is shared between a functional coherent interconnect unit and a checker coherent interconnect unit. Thus, the Local memory for the interconnects is shared. Thus, local memory and the transport interconnect, which is part of the transport network discussed below, do not need to be duplicated in accordance with some aspects of the invention.

The transport network that couples the units is a means of communication that transfers at least all semantic information necessary, between units, to implement coherence. The transport network, in accordance with some aspects and some embodiments of the invention, is a network-on-chip, though other known means for coupling interfaces on a chip can be used and the scope of the invention is not limited thereby. The transport network provides a separation of the interfaces between the agent interface unit (AIU), coherence controller, and memory interface units such that they may be physically separated.

A transport network is a component of a system that provides standardized interfaces to other components and functions to receive transaction requests from initiator components, issue a number (zero or more) of consequent requests to target components, receive corresponding responses from target components, and issue responses to initiator components in correspondence to their requests. A transport network, according to some embodiments of the invention, is packet-based. It supports both read and write requests and issues a response to every request. In other embodiments, the transport network is message-based. Some or all requests cause no response. In some embodiments, multi-party transactions are used such that initiating agent requests go to a coherence controller, which in turn forwards requests to other caching agents, and in some cases a memory, and the agents or memory send responses directly to the initiating requestor. In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic. In some embodiments, the transport network is a network-on-chip with a grid-based mesh or depleted-mesh type of topology. In other embodiments, a network-on-chip has a topology of switches of varied sizes. In some embodiments, the transport network is a crossbar. In some embodiments, a network-on-chip uses virtual channels.

According to another aspect of the invention, each type of unit can be implemented as multiple separate instances. A typical system has one agent interface unit associated with each agent, one memory interface unit associated with each of a number of main memory storage elements, and some number of coherence controllers, each responsible for a portion of a memory address space in the system.

In accordance with some aspects of the invention, there does not need to be a fixed relationship between the number of instances of any type and any other type of unit in the system. A typical system has more agent interface units than memory interface units, and a number of coherence controllers that is in a range close to the number of memory interface units. In general, a large number of coherent agents in a system, and therefore a large number of agent interface units implies large transaction and data bandwidth requirements, and therefore requires a large number of coherence controllers to receive and process coherence commands and to issue snoop requests in parallel, and a large number of memory interface units to process memory command transactions in parallel.

Separation of coherence functions into functional units and replication of instances of functional units according to the invention provides for systems of much greater bandwidth, and therefore a larger number of agents and memory interfaces than is efficiently possible with a monolithic unit. Furthermore, some aspects of the cache coherent interconnect are not duplicated. In accordance with the aspects of the invention, the AIU are duplicated so that there is a functional unit and a checker unit. Additionally, the directory and the DMI are duplicated.

In accordance with some aspects of the invention, some embodiments include more than one coherence controller, each coherence controller is responsible for a specific part of the address space, which may be contiguous, non-contiguous or a combination of both. The transport network routes transaction information to a particular coherence controller as directed by sending units. In some embodiments, the choice of coherence controller is done based on address bits above the address bits that index into a cache line, so that the address space is interleaved with such a granularity that sequential cache line transaction requests to the agent interface unit are sent to alternating coherence controllers. Other granularities are possible.

In other embodiments that capture other aspects of the invention, the choice of coherence controller to receive the requests is determined by applying a mathematical function to the address. This function is known as a hashing function. In accordance with some aspects and some embodiments of the invention, the hashing function causes transactions to be sent to a number of coherence controllers that is not a power of two. The association of individual cache line addresses in the address space to coherence controllers can be any arbitrary assignment; provided there is a one-to-one association of each cache-line address to a specific coherence controller.

According to some aspects and embodiments, coherence controllers perform multiple system functions beyond receiving transaction requests and snoop responses and sending snoop requests, memory transactions, and transaction responses. Some such other functions include snoop filtering, exclusive access monitors, and support for distributed virtual memory transactions.

In accordance with some aspects, embodiments that comprise more than one memory interface unit, each memory interface unit is responsible for a certain part of the address space, which may be contiguous, non-contiguous or a combination of both. For each read or write that requires access to memory, the coherence controller (or in some embodiments, also the agent interface unit) determines which memory interface unit from which to request the cache line. In some embodiments, the function is a simple decoding of address bits above the address bits that index into a cache line, but it can be any function, including ones that support numbers of memory interface units that are not powers of two. The association of individual cache line addresses in the address space to memory interface units can be any arbitrary assignment; provided there is a one-to-one association of individual cache-line addresses to specific memory interface units.

In some embodiments, agent interface units may have a direct path through the transport network to memory interface units for non-coherent transactions. Data from such transactions may be cacheable in an agent, in an agent interface unit, or in a memory interface unit. Such data may also be cacheable in a system cache or memory cache that is external to the cache coherence system.

The approach to chip design of logical and physical separation of the functions of agent interface, coherence controller, and memory interface enables independent scaling of the multiplicity of each function from one chip design to another. That includes both logical scaling and physical scaling. This allows a single semiconductor IP product line of configurable units to serve the needs of different chips within a family, such as a line of mobile application processor chips comprising one model with a single DRAM channel and another model with two DRAM channels or a line of internet communications chips comprising models supporting different numbers of Ethernet ports. Furthermore, such a design approach allows a single semiconductor IP product line of configurable units to serve the needs of chips in a broad range of application spaces, such as simple consumer devices as well as massively parallel multiprocessors.

Referring now to FIG. 1, a system 10 is shown with a functional coherent interconnect 12 and a checker coherent interconnect 14, which are in lock-step in accordance with some aspects of the invention. The functional coherent interconnect 12 receives a request. After one or more clock cycle delay caused by a delay unit 16, the inputs to the functional coherent interconnect are applied to the checker coherent interconnect 14. As used herein, the delay unit each cause a one or more cycle delay to each input signal into the functional coherent interconnect. The functional coherent interconnect 12 and a checker coherent interconnect 14 each receive the same incoming request and process the request in lock-step. All the outputs of the functional coherent interconnect 12 is sent to a delay unit 18 and then to a comparator 20. As used herein, the delay unit 18 apply the same delay as the unit 16. The output of the checker coherent interconnect 14 is already delayed by one or multiple clock-cycles and, hence, can be sent directly to the comparator 20.

In one embodiment of this invention, the functional coherent interconnect 12 is in communication with local memory 22, such as one or multiple SRAM. An output of the functional coherent interconnect 12 is sent to the memory 22 and to a delay unit 24 and a comparator 26. The output from the memory 22 is sent to the functional coherent interconnect 12 and to a delay unit 28 and to the checker coherent interconnect 14 after a delay of one or more clock cycle. The delay units 16, 18, 24 and 28 are all delaying their input signals by the same number of clock cycle, which can be one, or more. The output of the checker coherent interconnect 14 is already delayed by one or more clock cycle and, thus us sent directly to the comparator 26. The output from each comparator 20 and comparator 26 are sent to a fault detection unit 30. The fault detection unit 30 can determine if there were any errors or faults in the functional coherent interconnect 12's outputs and proceed accordingly. In accordance with some aspects of the invention, the fault detector 30 alerts system 10 that a fault has occurred and the system 10 can address or correct the error.

In operation, the driver of an input port of the functional coherent interconnect 12 is also used to drive the same input port of the checker coherent interconnect 14 at least one clock cycle later through the delay units 16 and 28, as noted above. The output port of the functional coherent interconnect 12 is delayed at least one clock cycle, through the delay units 18 and 24, and sent to the comparators 20 and 26 while the output port of the checker coherent interconnect is sent to the comparators 20 and 26.

The comparators 20 and 26 compares all the outputs of functional coherent interconnect 12, delayed by at least one clock cycle, with all the outputs of the checker coherent interconnect 14. The comparators 20 and 26 determine if the output of the functional coherent interconnect 12, after the delay, is the same as the output of the checker coherent interconnect 14. Thus, the comparators 20 and 26 determine if an error has occurred based on if a mismatch is found.

Figure 2:
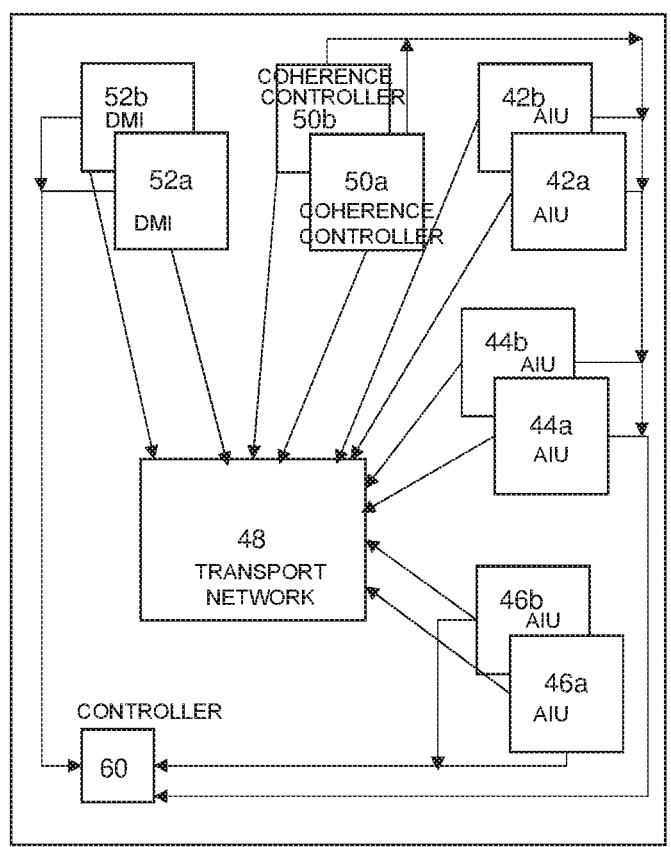
FIG. 2 illustrates an embodiment of a coherent interface in accordance with various aspects of the invention.

Referring now to FIG. 2 a coherent interconnect 40 is shown in accordance with various aspects of the invention. In accordance with some aspects of the invention and some embodiments, the coherent interconnect is divided into a set of functional units and a transport network. The set of functional units further comprise logic functions and the functional units can contain local memory. The functional units are replicated in the coherent interconnect and the local memory and the transport network is not. In accordance with the various aspects of the invention, the transport network handles communication between functional units and each functional unit is duplicated and the two identical units are labelled functional and checker. For example, the system 40 includes replication of the Agent Interface Unit (AIU), such that a functional AIU 42a is replicated by a checker AIU 42b, a functional AIU 44a and a checker AIU 44b, a functional AIU 46a and a checker AIU 46b, all of which share a common transport network 48. The interconnect 40 also includes a functional coherence controller 50a with a checker coherence controller 50b. Other examples of duplication for checking is a functional DMI 52a and a checker DMI 52b. The interconnect 40 also includes a safety controller 60 that is connected to each of the functional units and the checker units.

According to the various aspects of the invention, a comparator, which compares at least two inputs, is in communication with the functional interconnect units and the checker interconnect units. such as AIU 42a (functional) and AIU 42b (checker). Each driver of an input port of the functional interconnect unit, is also used to drive the same input port of the checker interconnect unit after a delay of at least one clock cycle. Each output port of the functional interconnect unit is delayed by at least one clock cycle and sent to the comparator, as discussed with respect to FIG. 1. The same output port of the checker interconnect unit is sent to the comparator. The comparator compares all the outputs of all functional interconnect units, after the delay of at least one clock cycle, with the corresponding outputs of all the checker interconnect units to determine if the output of the functional interconnect units is the same as the output of the checker interconnect unit, in order to determine if an error has occurred, which is indicated when a mismatch is found. When a mismatch is found, the safety controller 60 reports the error to the system 40 and the system can take further action to mitigate the consequences of the error.

In accordance with various aspects of the invention, each cache line consists of 64 bytes. Therefore, address bits 6 and above choose a cache line. In accordance with some aspects of the invention and this embodiment, each cache line address range is mapped to an alternating coherence controller. Alternating ranges of two cache lines are mapped to different memory interfaces. Therefore, requests for addresses from 0x0 to 0x3F go to coherence controller (CC) 0 and addresses from 0x40 to 0x7F go to CC 1. If either of those coherence controllers fails to find the requested line in a coherent cache, a request for the line is sent to memory interface (MI) 0. Likewise, requests for addresses from 0x80 to 0xBF go to CC 0 and addresses from 0xC0 to 0xFF go to CC 1. If either of those coherence controllers fails to find the requested line in a coherent cache, a request for the line is sent to MI 1.

The ranges of values provided above do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In accordance with various aspects and some embodiments of the invention, the address hashing function for coherence controllers and the address hashing function for memory interface units is the same. In such a case, there is necessarily a one-to-one relationship between the presence of coherence controllers and memory interface units, and each coherence controller is effectively exclusively paired with a memory interface unit. Such pairing can be advantageous for some system physical layouts, though does not require a direct attachment or any particular physical location of memory interface units relative to coherence controllers. In some embodiments, the hashing functions for coherence controllers are different from that of memory interface units, but the hashing is such that a cache coherence controller unit is exclusively paired with a set of memory interface units or such that a number of coherence controllers are exclusively paired with a memory interface unit. For example, if there is 2-way interleaving to coherence controller units and 4-way interleaving to memory interface units, such that pairs of memory interface units each never get traffic from one coherence controller unit, then there are two separate hashing functions, but exclusive pairing.

In accordance with various aspects and some embodiments of the invention, logical connectivity exists between all units, except for connectivity between coherence controllers and except for connectivity between memory interface units. This high degree of connectivity may be advantageous in some systems for minimizing latency. Such a configuration, with three agent interface (AI) units, two coherence controllers (CC), and two memory interface (MI) units. In such a configuration, one possible method of operation for a read memory request is as follows:

1. Agent interface units send read requests to coherence controllers.
2. Coherence controllers send snoops to as many agent interface units as necessary.
3. Agent interface units snoop their agents and send snoop responses to coherence controllers and, if the cache line is present in the agent cache, send the cache line to the requesting agent interface unit.
4. If a requested cache line is not found in an agent cache then the coherence controller sends a request to the memory interface unit.
5. The memory interface unit accesses memory, and responds directly to the requesting agent interface unit.

A possible method of operation for a write memory request is as follows:

1. Agent interface units send write requests to coherence controllers.
2. Coherence controllers send snoops to as many agent interface units as necessary.

3. Agent interface units snoop their agents and cause evictions and write accesses to memory or, alternatively, forwarding of data to the requesting agent interface unit.

In some embodiments data writes are issued from a requesting agent interface unit directly to destination memory interface units. The agent interface unit is aware of the address interleaving of multiple memory interface units. In alternative embodiments, data writes are issued before, simultaneously with, or after coherent write commands are issued to coherence controllers. In some embodiments, the requesting agent interface unit receives cache lines from other AIUs, and merges cache line data with the data from its agent before issuing cache line writes to memory interface units.

Other embodiments may have advantages in physical layout by having less connectivity. In accordance with various aspects and some embodiments of the invention, there is no connectivity between coherence controllers and memory interfaces. Such an embodiment requires that if the requested line is not found in an agent cache, the coherence controller responds as such to the requesting agent interface unit, which then initiates a request to an appropriate memory interface unit. In accordance with various aspects of the invention, the connectivity of another configuration is changed so that memory interface units respond to coherence controllers, which in turn respond to agent interface units.

In accordance with various aspects of the invention, with a one-to-one pairing between coherence controllers and memory interface units such that each need no connectivity to other counterpart units. In accordance with various aspects and some embodiments of the invention, the connectivity of a very basic configuration is each agent interface unit is coupled exclusively with a single coherence controller, which is coupled with a single memory interface unit.

The physical implementation of the transport network topology is an implementation choice, and need not directly correspond to the logical connectivity. The transport network can be, and typically is, configured based on the physical layout of the system. Various embodiments have different multiplexing of links to and from units into shared links and different topologies of network switches.

System-on-chip (SoC) designs can embody cache coherence systems according to the invention. Such SoCs are designed using models written as code in a hardware description language. A cache coherent system and the units that it comprises, according to the invention, can be embodied by a description in hardware description language code stored in a non-transitory computer readable medium.

Many SoC designers use software tools to configure the coherence system and its transport network and generate such hardware descriptions. Such software runs on a computer, or more than one computer in communication with each other, such as through the Internet or a private network. Such software is embodied as code that, when executed by one or more computers causes a computer to generate the hardware description in register transfer level (RTL) language code, the code being stored in a non-transitory computer-readable medium. Coherence system configuration software provides the user a way to configure the number of agent interface units, coherence controllers, and memory interface units; as well as features of each of those units. Some embodiments also allow the user to configure the network topology and other aspects of the transport network. Some embodiments use algorithms, such as ones that use graph theory and formal proofs, to generate a topology network. Some embodiments allow the user to configure units' duplication and safety controller existence.

Some typical steps for manufacturing chips from hardware description language descriptions include verification, synthesis, place & route, tape-out, mask creation, photolithography, wafer production, and packaging. As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Another benefit of the separation of functional units, according to the invention, is that intermediate units can be used for monitoring and controlling a system. For example, some embodiments of the invention include a probe unit within the transport network between one or more agent interface units and the other units to which it is coupled. Different embodiments of probes perform different functions, such as monitoring bandwidth and counting events. Probes can be placed at any point in the transport network topology.

The invention can be embodied in a physical separation of logic gates into different regions of a chip floorplan. The actual placement of the gates of individual, physically separate units might be partially mixed, depending on the floorplan layout of the chip, but the invention is embodied in a chip in which a substantial bulk of the gates of each of a plurality of units is noticeably distinct within the chip floorplan.

The invention can be embodied in a logical separation of functionality into units. Units for agent interface units, coherence controller units, and memory interface units may have direct point-to-point interfaces. Units may contain a local memory such as SRAM. Alternatively, communication between units may be performed through a communication hub unit.

The invention, particularly in terms of its aspect of separation of function into units, is embodied in systems with different divisions of functionality. The invention can be embodied in a system where the functionality of one or more of the agent interface units, coherence controller units, and memory interface units are divided into sub-units, e.g. a coherence controller unit may be divided into a request serialization sub-unit and a snoop filter sub-unit. The invention can be embodied in a system where the functionality is combined into fewer types of units, e.g. the functionality from a coherence controller unit can be combined with the functionality of a memory interface unit. The invention can be embodied in a system of arbitrary divisions and combinations of sub-units.

Some embodiments of a cache coherent system according to the invention have certain functionality between an agent and its agent interface unit. The functionality separates coherent and non-coherent transactions. Non-coherent transactions are requested on an interface that is not part of the cache coherent system, and only coherent transactions are passed to the agent interface unit for communication to coherence controller units. In some embodiments, the function of separating coherent and non-coherent transactions is present within the agent interface unit.

In accordance with some aspects and some embodiments of the invention, one or more agent interface units communicate with IO-coherent agents, which themselves have no coherent caches, but require the ability to read and update memory in a manner that is coherent with respect to other coherent agents in the system using a direct means such as transaction type or attribute signaling to indicate that a transaction is coherent. In some aspects and embodiments, one or more agent interface units communicate with non-coherent agents, which themselves have no coherent caches, but require the ability to read and update memory that is coherent with respect to other coherent agents in the system using an indirect means such as address aliasing to indicate that a transaction is coherent. For both IO-coherent and non-coherent agents, the coupled agent interface units provide the ability for those agents to read and update memory in a manner that is coherent with respect to coherent agents in the system. By doing so, the agent interface units act as a bridge between non-coherent and coherent views of memory. Some IO-coherent and non-coherent agent interface units may include coherent caches on behalf of their agents. In some embodiments, a plurality of agents communicate with an agent interface unit by aggregating their traffic via a multiplexer, transport network or other means. In doing so, the agent interface unit provides the ability for the plurality of agents to read and update memory in a manner that is coherent with respect to coherent agents in the system. In some aspects and embodiments, different agent interface units communicate with their agents using different transaction protocols and adapt the different transaction protocols to a common transport protocol in order to carry all necessary semantics for all agents without exposing the particulars of each agent's interface protocol to other units within the system. Furthermore, in accordance with some aspects as captured in some embodiments, different agent interface units interact with their agents according to different cache coherence models, while adapting to a common model within the coherence system. By so doing, the agent interface unit is a translator that enables a system of heterogeneous caching agents to interact coherently.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects and embodiments discussed and described herein. Rather, the scope and spirit of invention is embodied by the appended claims.

What is claimed is:

1. A system-on-chip (SoC) with cache coherent memory, the SoC comprising:
    at least one agent sending read and write transactions;
    memory, including coherent memory regions, in communication with the agent;
    a coherent interconnect in communication with the memory and the agent, wherein the coherent interconnect is divided into:
    a set of functional units; and
    a communication network,
    wherein the set of functional units further comprise logic functions and the functional units include embedded memory,
    wherein the communication network handles communication between the functional units and each functional unit is duplicated at logic level but not the embedded memory and the two identical functional units are labelled early and late; and
    a comparator for comparing at least two inputs, the comparator is in communication with the early functional unit and the late functional unit;
    wherein a driver of an input port of the early functional unit is also used to drive an input port of the late functional unit at least one clock cycle later,
    wherein an output port of the early functional unit is delayed at least one clock cycle and a delayed output from the output port is sent to the comparator,
    wherein an output from an output port of the late functional unit is sent to the comparator,
    wherein the comparator compares the delayed output of the early functional unit with the output of the late functional unit,
    wherein the comparator determines if the delayed output of the early functional unit is the same as the output of the late functional unit.

2. The SoC of claim 1 further comprising a fault unit in communication with the comparator, wherein the comparator provides a comparator output to the fault unit and
    the fault unit determines if there is an error when the output of the comparator indicates a mismatch of inputs at the comparator.

3. The SoC of claim 1 wherein the comparator includes hardware logic for determining if the output from the early functional unit is the same as the output from the late functional unit.

4. A system-on-chip (SoC) comprising: at least one agent;
    memory, including coherent memory, in communication with the agent; and a coherent interconnect in communication with the memory and the agent, the interconnect comprising:
    a transport network in communication with the agent; a plurality of coherent interconnect elements in communication with the transport network, the plurality of coherent interconnect elements including:
    a plurality of functional coherent interconnect elements; a plurality of duplicate checker coherent interconnect elements, wherein a driver of an input port of each of the selected set of functional coherent interconnect elements is also used to drive an input port of each of the duplicate checker coherent interconnect elements at least one clock cycle later; and
    a controller in communication with each of the selected set of functional
    coherent interconnect elements and each of the duplicated checker coherent interconnect elements,
    wherein each output port of each of the selected set of functional coherent interconnect elements is delayed at least one clock cycle and sent to the controller,
    wherein each output port of each of the duplicate checker coherent interconnect elements is sent to the controller without being delayed, wherein the controller compares outputs of each of the selected set of functional coherent interconnect elements with all the outputs of each of the duplicated checker coherent interconnect elements, and
    wherein the controller determines, based on the comparison, if a mismatch is found between the output of any one of the selected set of functional coherent interconnect elements and the output of the corresponding duplicate checker coherent interconnect elements.

5. The SoC of claim 4, wherein the controller determines that a fault has occurred when the mismatch is found.

6. The SoC of claim 4 further comprising a comparator in communication with the controller, wherein the controller provides a controller output signal to the comparator and the comparator determines if there is an error when the controller determines the mismatch.

7. The SoC of claim 4, wherein the controller determines that an error has occurred when the mismatch is found and signals the SoC to take further action to mitigate the consequence of the error.

8. The SoC of claim 4 further comprising:
    at least one functional coherence controller in communication with the agent, the transport network, and the memory; and
    at least one checker coherence controller in communication with the agent, the transport network, and the memory.

9. The SoC of claim 8, wherein the functional coherence controller and the checker coherence controller are identical.

10. The SoC of claim 9, wherein a driver of input ports of the functional coherence controller also drives input ports of the checker coherence controller at least one clock cycle later.

11. The SoC of claim 10, wherein output ports of the functional coherence controller are delayed at least one clock cycle and sent to the controller and output ports of the checker coherence controller are sent to the controller without being delayed and wherein the controller compares all the outputs of the functional coherence controller, after the delay of at least one clock cycle, with all the outputs of the checker coherence controller to determine, based on the comparison, if there is a mismatch.

12. A method comprising:
    sending transactions from an agent to a functional coherent interconnect; sending read and write transactions from the agent, after a delay, to a duplicate coherent interconnect, wherein the functional coherent interconnect and the duplicate coherent interconnect are identical;
    sending all outputs of functional coherent interconnect, after the delay, to a comparator;
    sending all outputs of the duplicate coherent interconnect, without the delay, to the comparator;
    comparing corresponding inputs at the comparator, one from the functional coherent interconnect after a delay and another from the checker coherent interconnect without a delay, to determine if there is a mismatch between the corresponding inputs; and signaling the SoC, using a controller, that an error has occurred when the mismatch is found so that the SoC can take further action to mitigate the consequence of the error.

* * * * *

UNITED STATES PATENT AND TRADEMARK OFFICE
CERTIFICATE OF CORRECTION

Page 1 of 1

PATENT NO. : 10,592,358 B2
APPLICATION NO. : 15/391727
DATED : March 17, 2020
INVENTOR(S) : Benoit de Lescure et al.

It is certified that error appears in the above-identified patent and that said Letters Patent is hereby corrected as shown below:

On the Title Page

Item (72):
[[Benoit deLescure, Berkeley, CA (US); Jean Philippe Loison, San Jose, CA (US); Alexis Boutilier, Campbell, CA (US); Rohit Bansal, San Jose, CA (US); Parimal Gaikwad, San Jose, CA (US)]]

Should read:
-- Benoit deLescure, Berkeley, CA (US); Jean Philippe Loison, San Jose, CA (US); Alexis Boutilier, Campbell, CA (US); Rohit Bansal, San Jose, CA (US); Parimal Gaikwad, San Jose, CA (US); Mohammed Khaleeluddin, Union City, CA (US) --

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*